(12) United States Patent
Hendry et al.

(10) Patent No.: US 11,729,392 B2
(45) Date of Patent: *Aug. 15, 2023

(54) VIDEO ENCODING METHOD, VIDEO DECODING METHOD, AND APPARATUS USING SAME

(71) Applicant: LG ELECTRONICS INC., Seoul (KR)

(72) Inventors: Hendry Hendry, Seoul (KR); Jungsun Kim, Seoul (KR); Chulkeun Kim, Seoul (KR); Byeongmoon Jeon, Seoul (KR); Sangoh Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,040

(22) Filed: Jan. 7, 2022

(65) Prior Publication Data

US 2022/0132129 A1    Apr. 28, 2022

Related U.S. Application Data

(63) Continuation of application No. 17/088,409, filed on Nov. 3, 2020, now Pat. No. 11,245,907, which is a
(Continued)

(51) Int. Cl.
*H04N 19/13* (2014.01)
*H04N 19/91* (2014.01)
(Continued)

(52) U.S. Cl.
CPC ........... *H04N 19/13* (2014.11); *H04N 19/112* (2014.11); *H04N 19/129* (2014.11);
(Continued)

(58) Field of Classification Search
None
See application file for complete search history.

(56) References Cited

U.S. PATENT DOCUMENTS

| 6,671,376 B1 | 12/2003 | Koto ................. G06T 9/004 348/394.1 |
| 9,106,930 B2 | 8/2015 | Hendry |

(Continued)

FOREIGN PATENT DOCUMENTS

| CN | 101742300 A | 6/2010 |
| CN | 102131107   | 7/2011 |

(Continued)

OTHER PUBLICATIONS

Feng Fei-long et al., "Multi-core Parallel Algorithm Based on H.264 Real-Time Encoding," Computer Engineering, Dec. 2010, vol. 36, No. 24, (3 Pages).

(Continued)

*Primary Examiner* — Mohammad J Rahman
(74) *Attorney, Agent, or Firm* — Bryan Cave Leighton Paisner LLP

(57) ABSTRACT

The present invention relates to a video encoding method, to a video decoding method, and to an apparatus using same. The video encoding method according to the present invention comprises the steps of: setting a tile and a slice for the inputted current picture; performing encoding based on the tile and the slice; and a step of transmitting the encoded video information. The current picture may include one or more tiles and one or more slices. The largest coding units (hereinafter, referred to as LCUs) in the slice may be arranged based on a tile scan.

13 Claims, 18 Drawing Sheets

Related U.S. Application Data continuation of application No. 16/598,984, filed on Oct. 10, 2019, now Pat. No. 10,863,178, which is a continuation of application No. 16/109,214, filed on Aug. 22, 2018, now Pat. No. 10,491,901, which is a continuation of application No. 15/651,178, filed on Jul. 17, 2017, now Pat. No. 10,085,026, which is a continuation of application No. 14/411,313, filed as application No. PCT/KR2013/005636 on Jun. 26, 2013, now Pat. No. 9,736,482.

(60) Provisional application No. 61/672,750, filed on Jul. 17, 2012, provisional application No. 61/664,701, filed on Jun. 26, 2012.

(51) Int. Cl.

| | | |
|---|---|---|
| *H04N 19/112* | (2014.01) | |
| *H04N 19/129* | (2014.01) | |
| *H04N 19/167* | (2014.01) | |
| *H04N 19/174* | (2014.01) | |
| *H04N 19/176* | (2014.01) | |
| *H04N 19/70* | (2014.01) | |
| *H04N 19/119* | (2014.01) | |

(52) U.S. Cl.
CPC ......... *H04N 19/167* (2014.11); *H04N 19/174* (2014.11); *H04N 19/176* (2014.11); *H04N 19/91* (2014.11); *H04N 19/119* (2014.11); *H04N 19/70* (2014.11)

(56) References Cited

U.S. PATENT DOCUMENTS

| | | | |
|---|---|---|---|
| 2005/0053296 A1 | 3/2005 | Shinivasan et al. | |
| 2006/0227131 A1 | 10/2006 | Schiwietz | |
| 2010/0303153 A1 | 12/2010 | Kadono | H04N 19/107 375/240.13 |
| 2011/0038557 A1 | 2/2011 | Closset | |
| 2011/0188572 A1 | 8/2011 | Min | |
| 2011/0206289 A1 | 8/2011 | Dikbas et al. | |
| 2012/0014457 A1 | 1/2012 | He | H04N 19/136 375/240.25 |
| 2012/0026020 A1 | 2/2012 | Korodi | H03M 7/4006 341/51 |
| 2012/0106622 A1 | 5/2012 | Huang | H04N 19/426 375/240.01 |
| 2012/0163452 A1 | 6/2012 | Horowitz | |
| 2012/0219055 A1 | 8/2012 | He | H04N 19/124 375/240.03 |
| 2012/0230399 A1* | 9/2012 | Segall | H04N 19/61 375/E7.027 |
| 2012/0307894 A1* | 12/2012 | Chien | H04N 19/176 375/E7.243 |
| 2012/0314767 A1* | 12/2012 | Wang | H04N 19/593 375/E7.243 |
| 2012/0328003 A1 | 12/2012 | Chien | |
| 2013/0003830 A1* | 1/2013 | Misra | H04N 19/436 375/E7.243 |
| 2013/0003859 A1 | 1/2013 | Karczewicz | H04N 19/70 375/240.24 |
| 2013/0016771 A1* | 1/2013 | Misra | H04N 19/615 375/240.03 |
| 2013/0016786 A1* | 1/2013 | Segall | H04N 19/174 375/E7.123 |
| 2013/0034580 A1 | 4/2013 | Zhou | |
| 2013/0101035 A1 | 4/2013 | Wang | |
| 2013/0107973 A1 | 5/2013 | Wang | |
| 2013/0114735 A1 | 5/2013 | Wang | |
| 2013/0182775 A1 | 7/2013 | Wang | |
| 2013/0195199 A1 | 8/2013 | Guo | |
| 2013/0202051 A1 | 8/2013 | Zhou | H04N 19/436 375/240.26 |
| 2013/0266076 A1 | 10/2013 | Wang | |
| 2013/0272428 A1* | 10/2013 | Deshpande | H04N 19/174 375/E7.027 |
| 2013/0279817 A1 | 10/2013 | Wan | H04N 19/13 382/233 |
| 2014/0328413 A1 | 11/2014 | Esenlik | H04N 19/197 375/240.29 |
| 2015/0341642 A1 | 11/2015 | Hendry | H04N 19/13 375/240.02 |

FOREIGN PATENT DOCUMENTS

| | | |
|---|---|---|
| CN | 102447907 A | 5/2012 |
| CN | 102511161 | 6/2012 |
| EP | 2285111 | 2/2011 |
| JP | 2004-140473 A | 5/2004 |
| KR | 10-2011-0017783 A | 2/2011 |
| KR | 10-2011-0036520 A | 4/2011 |
| KR | 10-2011-0090065 A | 8/2011 |
| WO | 2011140960 A1 | 11/2011 |

OTHER PUBLICATIONS

Brass et al., JCTVC-I1003_d9: Joint Collaborative Team on Video Coding (JCT-VC) of ITU-T SG16 WP3 and ISO/IEC JTC1/SC29/WG11, 9th Meeting, Geneva, CH, Apr. 27-May 7, 2012, High efficiency video coding (HEVC) text specification Draft 7, (280 Pages).

Lee et al., "A New Scan Slice Encoding Scheme with Flexible Code for Test Data Compression," Dept. of Electrical and Electronic Engineering Yonsei University 2010 IEEE (pp. 217-220).

U.S. Appl. No. 16/598,984, filed Oct. 10, 2019.

U.S. Appl. No. 16/109,214, filed Aug. 22, 2018, U.S. Pat. No. 10,491,901.

U.S. Appl. No. 15/651,178, filed Jul. 17, 2017, U.S. Pat. No. 10,085,026.

U.S. Appl. No. 14/411,313, filed Dec. 24, 2014, U.S. Pat. No. 9,736,482.

Bross: "High efficiency video coding (HEVC) text specification draft 7", XP030112373, Joint Collaborative Team on Video Coding (JCT-VC) of ITU-T SG16 WP3 and ISO/IEC JTC29/WG11, 9th Meeting, Geneva, Ch, Apr. 27-May 7, 2012.

Wiegand, et al.: "Overview of the H.264/AVC Video Coding Standard", XP011221093, IEEE Transactions on Circuits and Systems for Video Technology, vol. 13, No. 7, Jul. 2003, pp. 560-576.

Hendry: "AHG 4: Constraint for slice and tile", XP030112571, Joint Collaborative Team on Video Coding (JCT-VC) of ITU-T SG16 WP3 and ISO/IEC JTC1/SC29/WG11, 10th Meeting, Stockholm, SE, Jul. 11-20, 2012.

Horowitz: "Mental cross-check of AHG 4: Constraint for slice and tile (JCTVC-J0209)", XP030054448, Joint Collaborative Team on Video Coding (JCT-VC) of ITU-T SG16 WP3 and ISO/IEC JTC1/SC29/WG11, 10th Meeting, Stockholm, SE, Jul. 11-20, 2012.

Bross: "Proposed Editorial Improvements for High efficiency video coding (HEVC)", XP030054710, Joint Collaborative Team on Video Coding (JCT-VC) of ITU-T SG16 WP3 and ISO/IEC JTC1/SC29/WG11, 11th Meeting, Shanghai, CN, Oct. 10-19, 2012.

U.S. Appl. No. 17/088,409, filed Nov. 30, 2020.

\* cited by examiner

FIG. 6
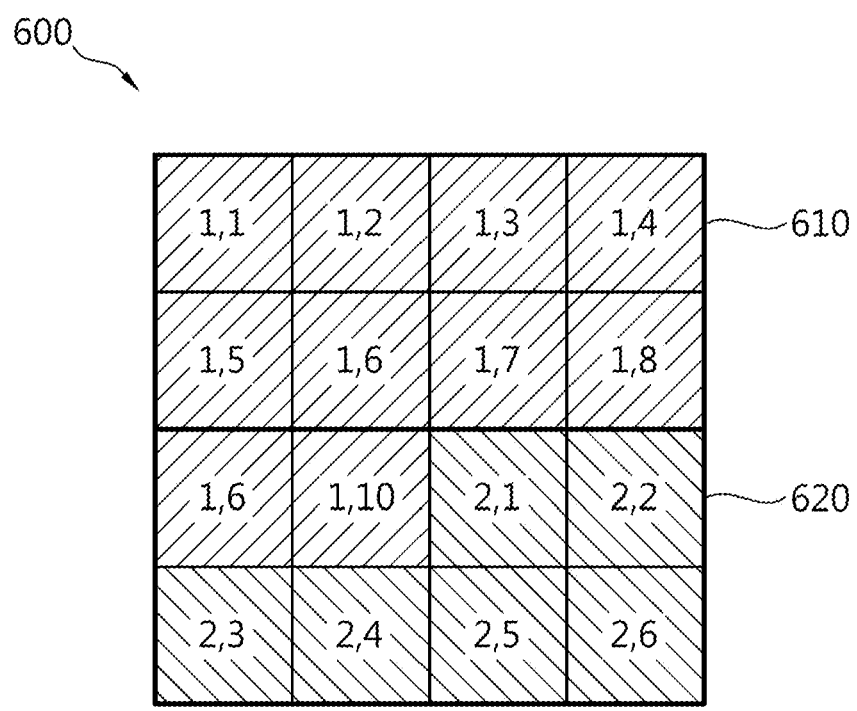

FIG. 7
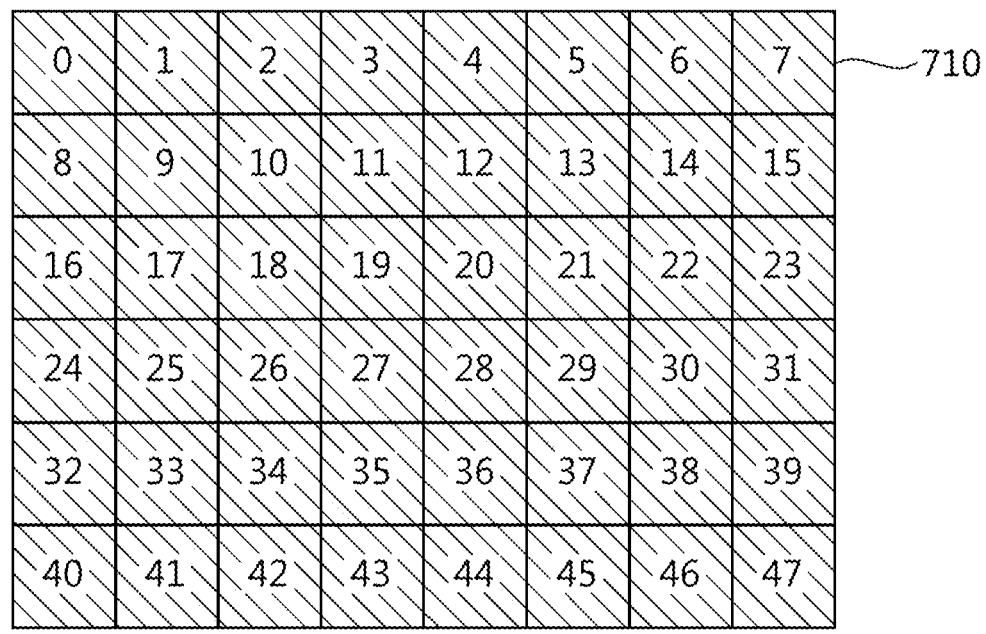
 x-TH LCU (CTB)    SLICE

FIG. 8
| 0 | 1 | 4 | 5 | 8 | 9 | 12 | 13 |
|---|---|---|---|---|---|---|---|
| 0 | | 1 | | 2 | | 3 | |
| 2 | 3 | 6 | 7 | 10 | 11 | 14 | 15 |
| 16 | 17 | 20 | 21 | 24 | 25 | 28 | 29 |
| 4 | | 5 | | 6 | | 7 | |
| 18 | 19 | 22 | 23 | 26 | 27 | 30 | 31 |
| 32 | 33 | 36 | 37 | 40 | 41 | 44 | 45 |
| 8 | | 9 | | 10 | | 11 | |
| 34 | 35 | 38 | 39 | 42 | 43 | 46 | 47 |
— 810
 x-TH LCU (CTB)    y-TH TILE

FIG. 9
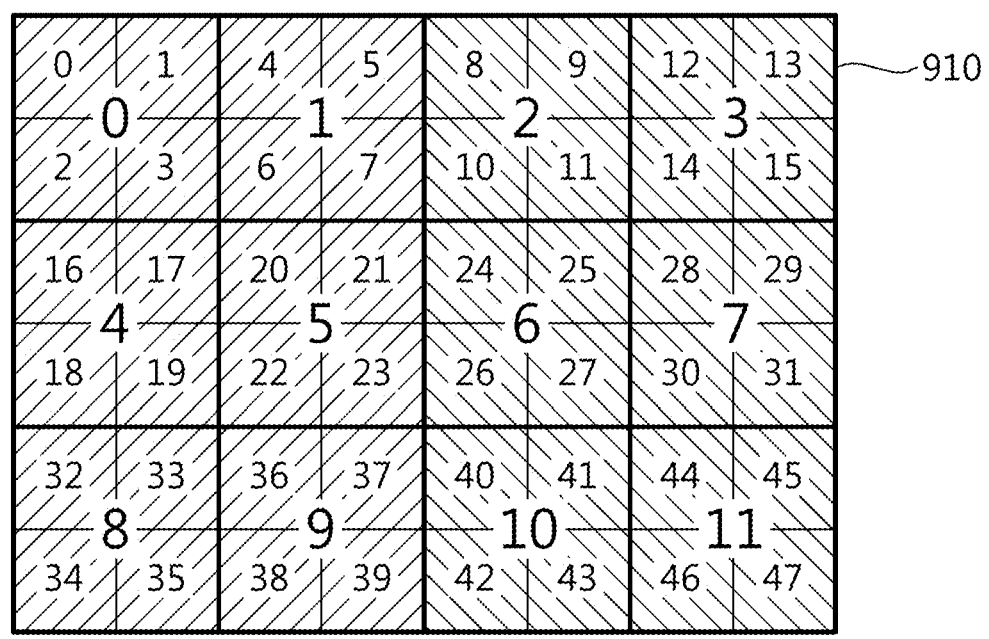
| x | x-TH LCU (CTB) | y | y-TH TILE |
  SLICES FIG. 12
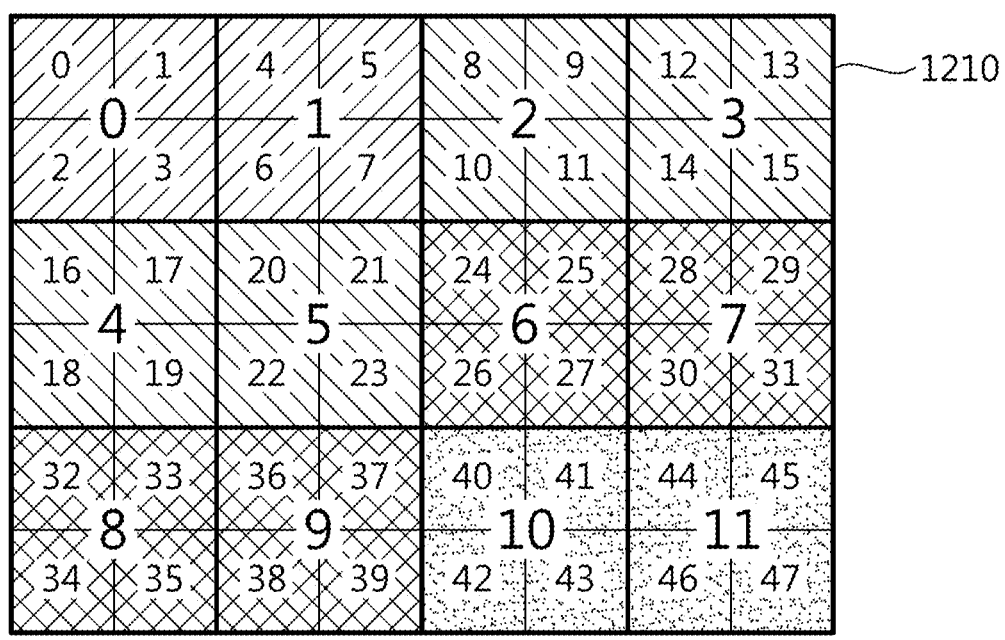
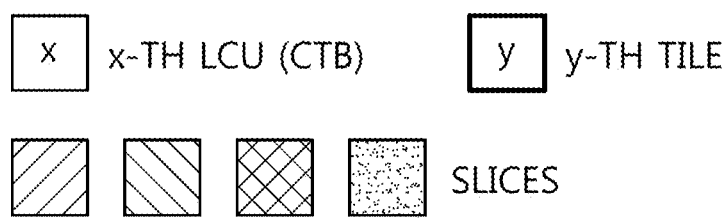

VIDEO ENCODING METHOD, VIDEO DECODING METHOD, AND APPARATUS USING SAME

This application is a continuation of U.S. patent application Ser. No. 17/088,409, filed Nov. 30, 2020, which is a continuation of U.S. patent application Ser. No. 16/598,984, filed Oct. 10, 2019, now allowed, which is a continuation of U.S. patent application Ser. No. 16/109,214, filed Aug. 22, 2018, now U.S. Pat. No. 10,491,901, which is a continuation of U.S. patent application Ser. No. 15/651,178, filed Jul. 17, 2017, now U.S. Pat. No. 10,085,026, which is a continuation of U.S. patent application Ser. No. 14/411,313, filed Dec. 24, 2014, now U.S. Pat. No. 9,736,482, which is a National Stage entry of International Application No. PCT/KR2013/005636 filed Jun. 26, 2013, which claims priority to U.S. Provisional Application Nos. 61/664,701, filed Jun. 26, 2012, and 61/672,750, filed Jul. 17, 2012, all of which are hereby incorporated by reference in its entirety.

TECHNICAL FIELD

The present invention relates to a video compression technique, and more particularly, to a method of specifying a region of a picture.

BACKGROUND ART

Recently, demands for a high-resolution and high-quality image have increased in various fields of applications. As an image has higher resolution and higher quality, an amount of data on the image increases more.

Accordingly, when image data is transferred using media such as existing wired or wireless broadband lines or image data is stored in existing storage media, the information transfer cost and the information storage cost increase.

High-efficiency image compressing techniques can be used to effectively transfer, store, and reproduce information on high-resolution and high-quality images.

Inter prediction and intra prediction can be used to enhance image compression efficiency. In the inter prediction, pixel values of a current picture are predicted with reference to information of other pictures. In the intra prediction, pixel values of a current picture are predicted using an inter-pixel relationship in the same picture.

Various methods for making an image equal to an original image can be applied to a process unit, for example, a block, of a predicted picture. Accordingly, a decoder can decode an image more accurately (more closely to an original image), and an encoder can encode an image to reconstruct the image more accurately.

Therefore, it is necessary to study about how to define process units in a picture, for example, how to define a constraint on process units or a constraint on use of the process units.

SUMMARY OF INVENTION

Technical Problem

An object of the invention is to provide a method and a device that can decoding and encoding efficiency.

Another object of the invention is to provide a configuration of slices and tiles that can enhance coding efficiency.

Still another object of the invention is to provide a configuration of tiles and largest coding units that can enhance coding efficiency and a coding method and a coding device using the configuration.

Still another object of the invention is to provide a method and a device for signaling entry point information for enhancing coding efficiency.

Technical Solution

According to an aspect of the invention, there is provided a video encoding method including the steps of: setting a tile and a slice in an input current picture; performing an encoding operation on the basis of the tile and the slice; and transmitting encoded video information, wherein the current picture includes one or more tiles and one or more slices, and wherein largest coding units (LCUs) in the slice are ordered in a tile scan.

According to another aspect of the invention, there is provided a video decoding method including the steps of: receiving video information; specifying a tile and a slice in a current picture on the basis of the received video information; and performing a decoding operation on the basis of the tile and the slice, wherein the current picture includes one or more tiles and one or more slices, and wherein largest coding units (LCUs) in the slice are ordered in a tile scan.

Advantageous Effects

According to the invention, it is possible to enhance coding efficiency using an effective configuration of slices and tiles.

According to the invention, it is possible to enhance coding efficiency using an effective configuration of tiles and largest coding units According to the invention, it is possible to accurately indicate an entry point for parallel processing by signaling entry point information.

DESCRIPTION OF DRAWINGS

FIG. 6 is a diagram schematically illustrating an example where a problem occurs in a parallel process.

FIG. 7 is diagram schematically illustrating an example of a raster scan order of LCUs.

FIG. 8 is diagram schematically illustrating an example of a raster scan order of LCUs.

FIG. 9 is a diagram schematically illustrating an example of a problem that may occur in a decoding process depending on a structure of slices and tiles.

FIGS. 11 to 15 are diagrams illustrating tile and slice configurations.

MODE FOR INVENTION

Figure 1:
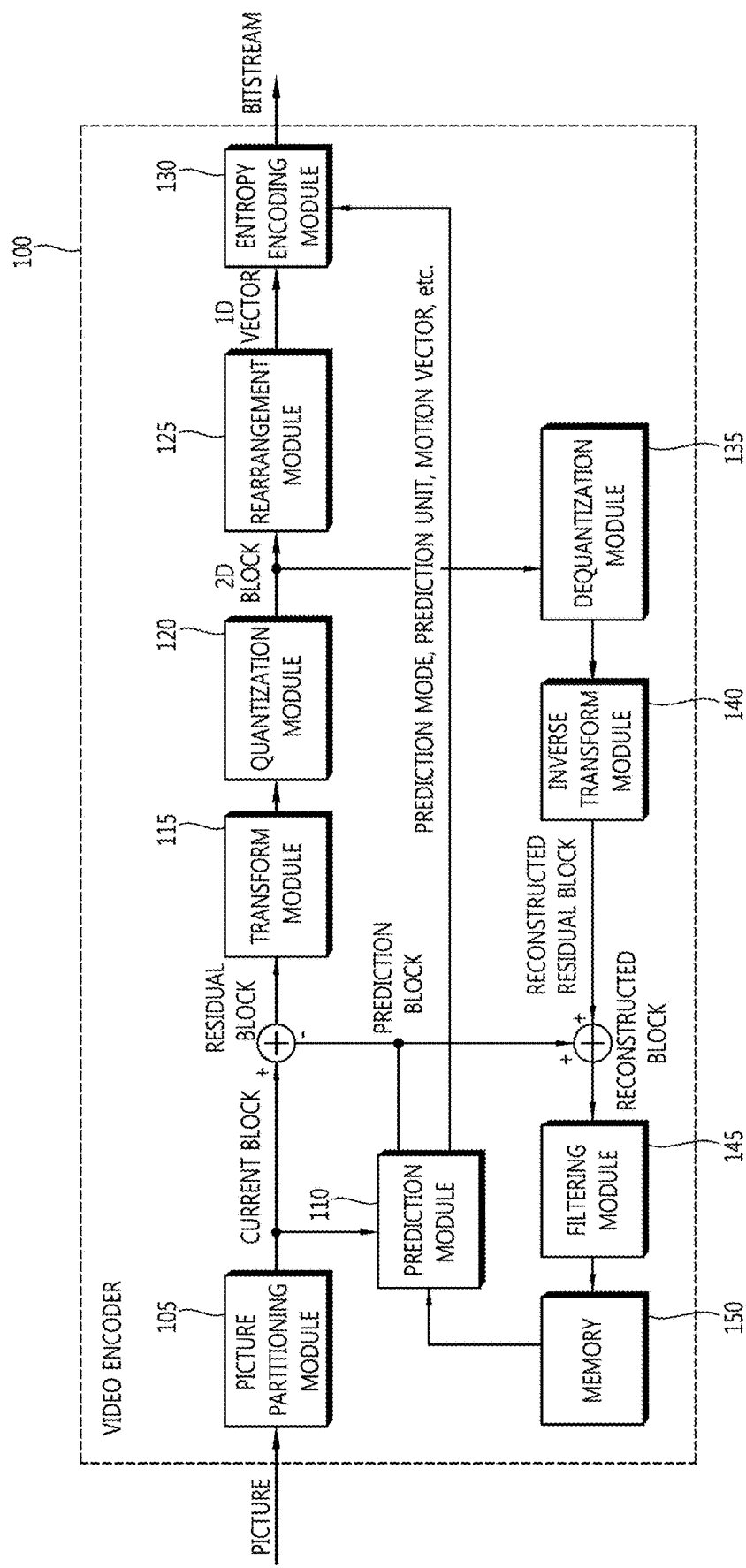
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating a video encoder according to an embodiment of the invention. Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filtering module 145, and a memory 150.

The picture partitioning module 105 may partition an input picture into at least one process unit block. Here, a block as the process unit may be a prediction unit (hereinafter, referred to as a "PU"), a transform unit (hereinafter, referred to as a "TU"), or a coding unit (hereinafter, referred to as a "CU").

The process unit blocks partitioned by the picture partitioning module 105 may have a quad-tree structure.

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block. In the prediction module 110, the processing unit of a picture may be a CU, a TU, or a PU. The prediction module 110 may determine whether the prediction performed on the corresponding processing unit is an inter prediction or an intra prediction, and may determine specific details (for example, a prediction mode) of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

In the inter prediction, a skip mode, a merge mode, an MVP (Motion Vector Prediction) mode, and the like may be used. In the inter prediction, a reference picture may be selected for a PU, and a reference block having the same size as the PU may be selected by integer pixel samples. Then, a prediction block in which a residual signal from the current PU is minimized and the motion vector magnitude is minimized is created.

The prediction block may be constructed in the unit of integer pixel samples or in the unit of pixel samples less than an integer pixel. Here, the motion vector may also be expressed in the unit of pixel samples less than an integer pixel.

Information such as an index, a motion vector (for example, a motion vector predictor), and a residual signal of a reference picture selected through the inter prediction is entropy-encoded and is transmitted to a decoder. When a skip mode is applied, a prediction block may be used as a reconstructed block and thus the residual signal may not be created, transformed, quantized, and transmitted at all.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

A PU may be a block having various sizes and shapes. For example, in case of inter prediction, a PU may be blocks having sizes such as 2N×2N, 2N×N, N×2N, and N×N (where N is an integer). In case of intra prediction, a PU may be blocks having sizes such as 2N×2N and N×N (where N is an integer). A PU with a size of N×N may be set to be applied to only a specific case. For example, the PU with a size of N×N may be set to be used for only a smallest CU or may be set to be used for only the intra prediction. In addition to the PUs with the above-mentioned sizes, PUs such as an N×mN block, an mN×N block, a 2N×mN block, and an mN×2N block (where m<1) may be additionally defined and used.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process depending on the prediction mode applied to a residual block and the size of the block.

For example, when intra prediction is applied to a residual block and the residual block has an 4×4 array, the residual block is transformed using discrete sine transform (DST). Otherwise, the residual block may be transformed using discrete cosine transform (DCT).

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may perform an entropy encoding operation on the quantization coefficients rearranged by the rearrangement module 125. Examples of the entropy encoding method include an exponential Golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a CU, prediction mode information, partition unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntaxes to be transmitted, if necessary.

The dequantization module 135 dequantizes the values (transform coefficients) quantized by the quantization module 120. The inverse transform module 140 inversely transforms the values dequantized by the dequantization module 135.

The residual values created by the dequantization module 135 and the inverse transform module 140 may be merged with the predicted block predicted by the prediction module 110 to construct a reconstructed block.

In FIG. 1, a residual block and a prediction block are added to create a reconstructed block by an adder. At this time, the adder may be considered as a particular module (reconstructed block creating module) that creates a reconstructed block.

The filtering module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering module 145 may not perform a filtering operation on the reconstructed block used in the inter prediction.

The memory 150 may store the reconstructed block or picture calculated by the filtering module 145. The reconstructed block or picture stored in the memory 150 may be supplied to the prediction module 110 that performs the inter prediction.

Figure 2:
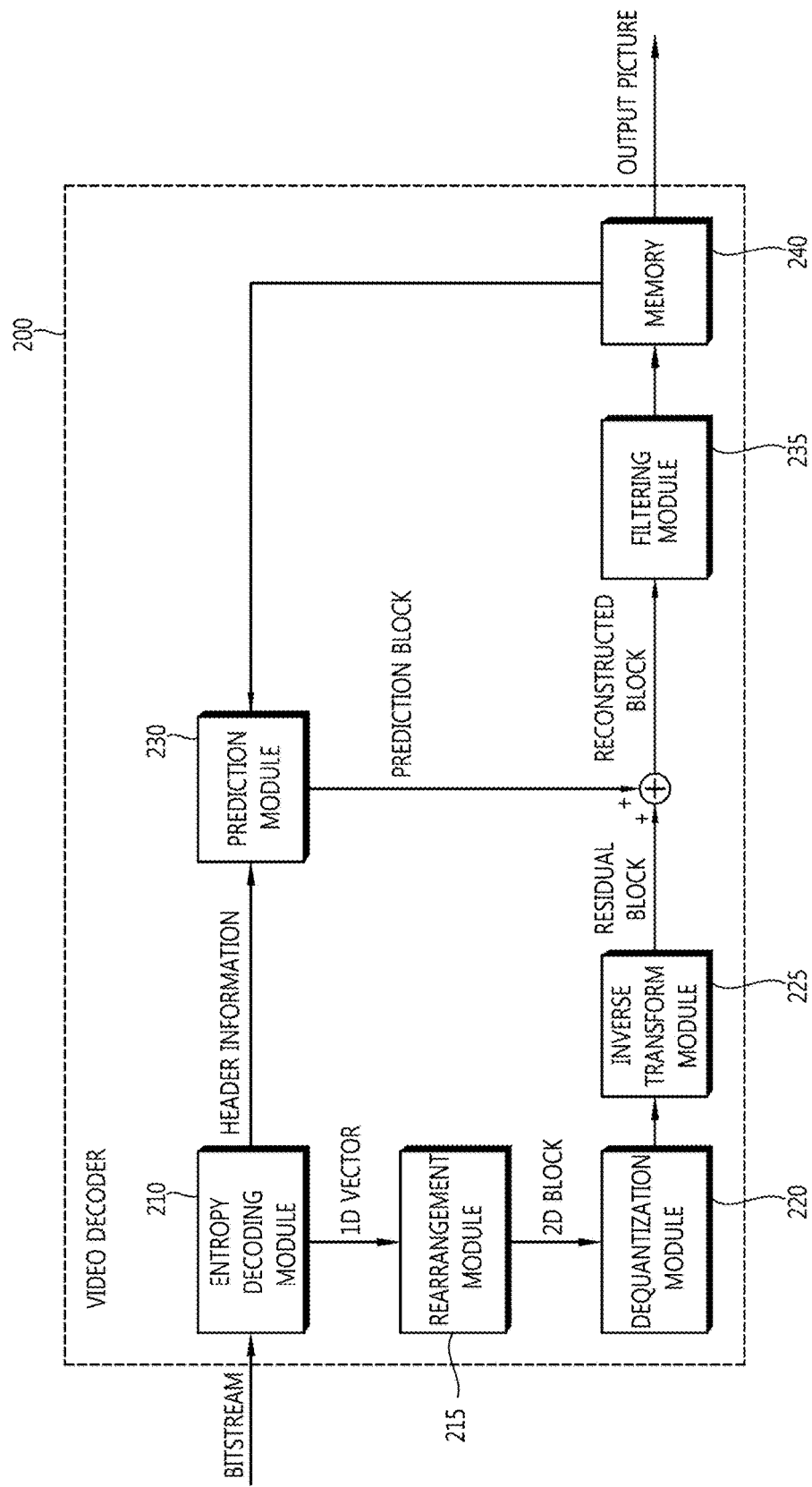
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filtering module 235, and a memory 240.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding operation, the entropy decoding module 210 may implement the same VLC table as the VLC table used in the video encoder and may perform the entropy decoding operation. When the video encoder uses the CABAC method to perform the entropy encoding process, the entropy decoding module 210 may perform the entropy decoding operation using the CABAC method to correspond thereto.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoder.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block (transform block) and the size of the transform block and may create an array of coefficients (quantized transform coefficients) in the form of a two-dimensional block.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder. The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 may construct a predicted block on the basis of prediction block construction information supplied from the entropy decoding module 210 and the previously-decoded block and/or picture information supplied from the memory 240.

When the prediction mode of a current CU and/or PU is an intra prediction mode, the prediction module 230 may perform an intra prediction operation of constructing a predicted block on the basis of pixel information of a current picture.

When the prediction mode for a current PU is the inter prediction mode, the prediction module 230 may perform the inter prediction operation on the current PU on the basis of information included in at least one of a previous picture and a subsequent picture of the current picture. At this time, motion information for the inter prediction of the current PU, for example, information on motion vectors and reference picture indices, supplied from the video encoder may be induced from a skip flag, a merge flag, and the like received from the video encoder.

The reconstructed block may be constructed using the predicted block constructed by the prediction module 230 and the residual block supplied from the inverse transform module 225. FIG. 2 illustrates that the residual block and the predicted block are added by an adder to construct a reconstructed block. Here, the adder may be considered as a particular module (reconstructed block constructing module) that constructs a reconstructed block.

When the skip mode is used, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The video encoder and the video decoder may partition a picture into predetermined units and may process (encode/decode) the partitioned units. For example, a picture may be partitioned into slices and tiles.

A slice may include a natural number of coding tree units (CTU) or coding tree blocks (CTB) belonging to an independent slice segment and dependent slice segments subsequent to the independent slice segment and prior to a next independent slice segment in a single access unit (AU).

A coding tree unit is a coding unit with a quad-tree structure and can be said to be a largest coding unit (LCU) because it is the largest coding unit.

A coding tree unit may be designated as a coding tree block of luma samples, a coding tree block two corresponding chroma samples in a picture having three sample arrays, and a syntax structure used to encode/decode the samples. Alternatively, a coding tree unit may be designated as a coding tree block of samples in a monochrome picture and a syntax structure used to encode/decode the samples, or may be designated as a coding tree block of samples in a picture coded using three separate color planes and a syntax structure used to encode/decode the samples.

A coding tree block is a largest coding block and coding blocks may be created by partitioning the coding tree block.

In this description, for the purpose of easy understanding of the invention, the coding tree unit (CTU), the largest coding unit (LCU), and the coding tree block (CTB) may be used interchangeably if necessary.

A slice segment includes an integer number of CTUs (or LCUs) that are consecutively ordered in a tile scan and that are included in a single network abstraction layer (NAL) unit.

In a slice segment, a part including data elements of the first coding tree block (coding tree unit) or all the coding tree blocks (coding tree units) of the slice segment is referred to as a slice segment head. When a current slice segment is an independent slice segment, the slice segment head of the independent slice segment is referred to as a slice header. When a current slice segment is a dependent slice segment, the slice segment header of the latest independent slice segment out of independent slice segments prior to the current slice segment in the decoding order is referred to as a slice header.

A slice may be a transmission unit of an NAL unit. For example, the NAL unit may include slices or slice segments.

Figure 3:
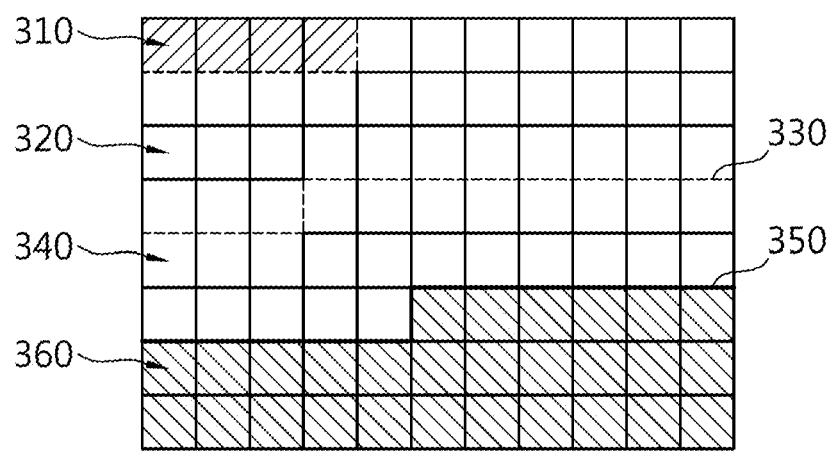
FIG. 3 is a diagram schematically illustrating an example of a slice.

FIG. 3 is a diagram schematically illustrating an example of a slice.

A current picture may be partitioned into multiple slices by slice boundaries. FIG. 3 illustrates an example where a current picture 300 is partitioned into two slices by a slice boundary 350.

A slice includes slice segments including coding tree units. The slice segments included in the slice may include an independent slice segment and may also include dependent slice segments when the dependent slice segments are present.

In the example illustrated in FIG. 3, the first slice includes an independent slice segment 310 including four coding tree units and a first dependent slice segment 320 including 32 coding tree units and a second dependent slice segment 340 including 24 coding tree units before and after a slice segment boundary 330. In the example illustrated in FIG. 3, one independent slice segment 360 includes 28 coding tree units.

A tile may be a sequence of coding tree units, coding tree blocks, or largest coding units. The coding tree unit may be a coding unit with a quad-tree structure and may be a largest coding unit (LCU). As described above, in this description, the coding tree unit and the largest coding unit may be used interchangeably if necessary for the purpose of easy understanding of the invention.

Specifically, a tile is a rectangular region within a particular tile column and a particular tile row in a picture. A tile column is a rectangular region of CTBs (or LCUs) having the same height as the height of the picture and having a width specified by signaling. A tile row is a rectangular region having the same width as the width of the picture and having a height specified by signaling.

As described above, the width of a tile column and the height of a tile row may be specified by syntax elements to be signaled. For example, the width of a tile column and the height of a tile row in a picture may be specified by syntax elements to be transmitted through the use of a picture parameter set of the picture.

A tile scan is a specific consecutive ordering of CTBs (or LCUs) partitioning a picture. In the tile scan, the consecutive ordering may mean that CTBs (or LCUs) are consecutively ordered in a CTB raster scan in a tile and tiles in a picture are consecutively ordered in a raster scan.

A tile may be a scan unit in a picture. Accordingly, the tiles may be consecutively ordered in a picture scan order, for example, in a raster scan order, in the picture.

Both or one of two following conditions may be established for the slices and the tiles. (1) All coding tree units or largest coding units in a slice belong to the same tile. (2) All coding tree units or largest coding units in a tile belong to the same slice.

Accordingly, a slice including multiple tiles and a tile including multiple slices may be present in the same picture.

Further, both or one of two following conditions may be established for the slice segments and the tiles. (1) All coding tree units or largest coding units in a slice segment belong to the same tile. (2) All coding tree units or largest coding units in a tile belong to the same slice segment.

Figure 4:
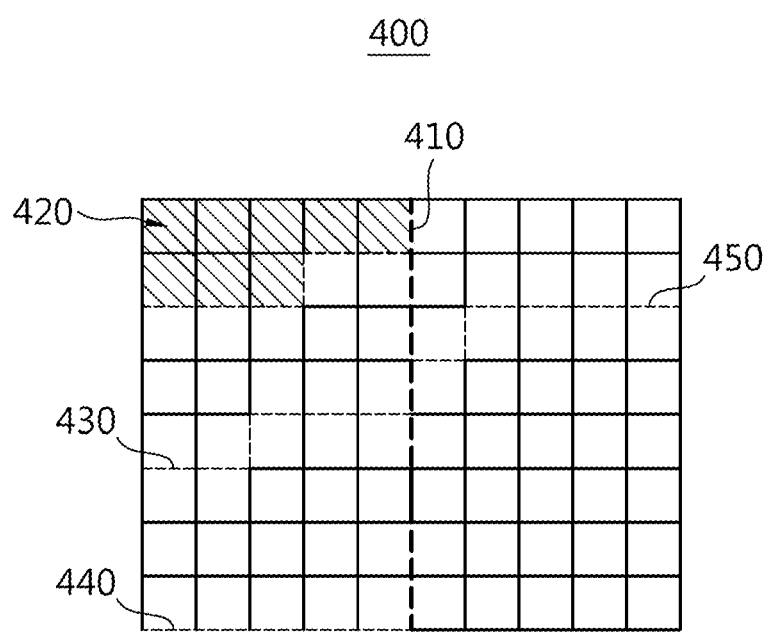
FIG. 4 is a diagram illustrating an example of a tile and a slice.

FIG. 4 is a diagram schematically illustrating an example of a tile and a slice.

A tile in a picture may be partitioned into multiple tiles by a tile boundary. In FIG. 4, a current picture 400 includes only one slice and is partitioned into two tiles on the right and left sides by a tile boundary 410.

A tile and a slice may be present together. In the example illustrated in FIG. 4, the slice of the current picture 400 includes an independent slice segment 420 and four dependent slice segments partitioned by slice segment boundaries 430, 440, and 450.

Figure 5:
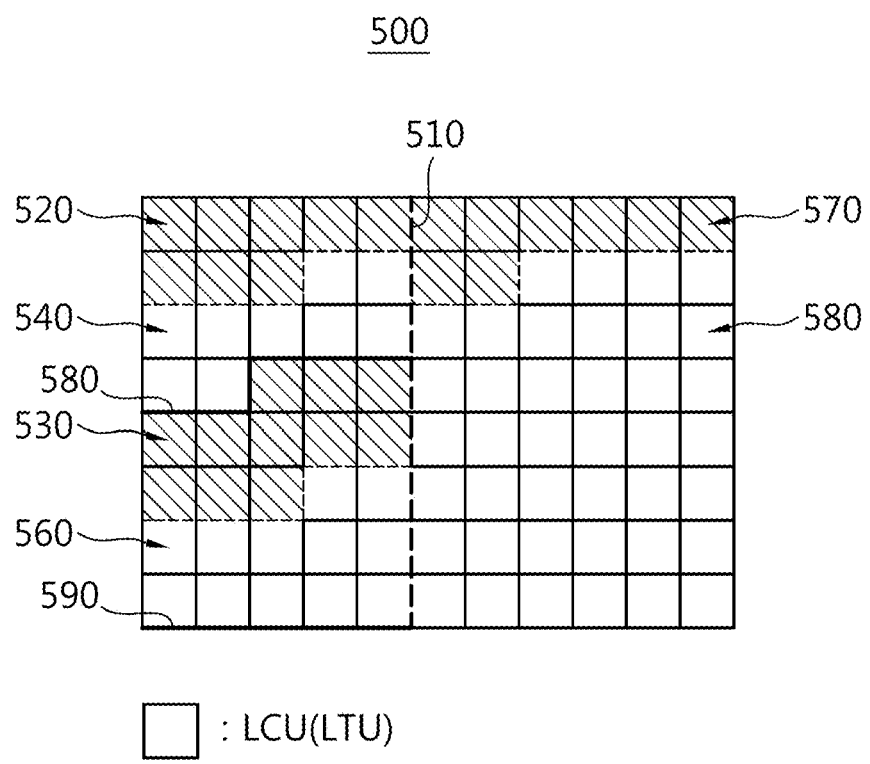
FIG. 5 is a diagram illustrating another example of a tile and a slice.

FIG. 5 is a diagram schematically illustrating another example of a tile and a slice.

FIG. 5 describes a current picture 500 is partitioned into two tiles on the right and left sides by a tile boundary 510 as an example.

In the example illustrated in FIG. 5, the left tile of the tile boundary 510 includes two slices partitioned by a slice boundary 550.

As described above, a slice may include an independent slice and may also include a dependent slice when the dependent slice is present. In FIG. 5, the upper slice of the slice boundary 550 includes an independent slice segment 520 and a dependent slice segment 540, and the lower slice of the slice boundary 550 includes an independent slice segment 530 and a dependent slice segment 560.

In the example illustrated in FIG. 5, a slice next to a slice boundary 590, that is, the slice in the second tile, includes an independent slice segment 570 and a dependent slice segment 580.

A tile and a slice may be independent decoding process units. For example, when parallel decoding is performed, each tile may be decoded by a single processing core and each slice may be decoded by a single processing core.

In this regard, as can be seen from FIGS. 4 and 5, a slice and a tile may be a sequence of consecutive coding tree blocks (coding tree units), but the tile may have a specific shape. For example, a tile may be a rectangular region, unlike the slice.

In this way, a decoding process may be differently performed between a slice and a tile.

For example, in case of a slice, each slice segment includes a slice segment header comprising data elements. As described above, a slice segment header of an independent slice segment may be referred to as a slice header.

On the contrary, a tile may not be a unit in which header information is present, but may be a parallel processing (for example, parallel decoding) unit.

Therefore, in case of tiles, inter-tile dependency does not occur for a break caused by row or column boundaries of the coding tree blocks. On the contrary, in case of slices, dependency at the time of decoding may cause a problem with row or column boundaries of the coding tree blocks. In other words, when a slice is processed in parallel with a row or a column as a boundary, it may be difficult to decode a part not including information of a slice header.

Therefore, as described above, predetermined constraints on tiles and slices may be necessary.

Relationships or constraints between tiles and slices will be specifically described below with reference to the accompanying drawings.

A strict constraint is not imposed on the relationship between a current slice and a current tile. The relationship between the current slice and the current tile based on the premise that one or more tiles may be present in a slice and one or more slices may be present in a tile may be expressed by a loose relationship.

This loose relationship may give flexibility to design of a decoding process, but may cause (1) a problem that a degree of parallel processing is constrained and (2) a problem that computation complexity increases.

FIG. 6 is a diagram schematically illustrating an example where a problem may occur in parallel processing.

It is assumed that the video encoder partitions a picture as illustrated in FIG. 6. Referring to FIG. 6, a region 600 of the picture includes tile 1 610 and tile 2 620. The region 600 in the picture includes two slices. The region 600 in the picture may be a partial region in the picture or the entire region in the picture.

The first slice includes 10 coding tree blocks (1, 1) to (1, 10) and the second slice includes 6 coding tree blocks (2, 1) to (2, 6).

It is assumed that processing core 1 and processing core 2, which are main bodies of the decoding process, process different tiles in parallel. For example, in the example illustrated in FIG. 6, processing core 1 processes tile 1 610 and processing core 2 processes tile 2 620. One problem which may occur in FIG. 6 is that processing cores 1 and 2 cannot perform a decoding process in parallel.

This is because the first LCU (coding tree block) of tile 2 620 is not a start portion of the slice and thus does not include information of the slice header. Accordingly, in the example illustrated in FIG. 6, the processing core has difficulty in performing a decoding process using the information of the slice header.

In the example illustrated in FIG. 6, when the tiles are independent and LCU (1, 9) and LCU (1, 10) are decoded, another problem may occur. For example, when independent tiles are used, intra prediction is not permitted at the tile boundary and thus LCU (1, 9) and LCU (1, 10) cannot refer to LCU (1, 5) and LCU (1, 6).

However, since LCU (1, 9), LCU (1, 10), LCU (1, 5), and LCU (1, 6) are included in the same slice and there is no constraint applicable to reference pixels in the slice of the example illustrated in FIG. 6 in the intra prediction, a confusion may occur in the decoding process.

Therefore, in order to reduce confusions and complexity that may occur in the parallel process, the following constraints may be imposed.

In a picture, a tile cannot traverse a slice boundary and a slice cannot traverse a tile boundary. In other words, an integer number of tiles has to be present in a slice when the slice includes tiles, and an integer number of slices has to be present in a tile when the tile includes slices.

Specifically, (1) A picture may be partitioned into one or more slices and/or one or more tiles.

(2) When a tile includes slices, an integer number of complete slices has to be present in the tile.

(3) When a slice includes tiles, an integer number of complete tiles has to be present in the slice.

Here, a complete tile is one tile and means the entire region of a tile not partitioned into parts. A complete slice is one slice and means the entire region of a slice not partitioned into parts.

The relationship between slices and tiles may be considered in view of CTB (or LCU). For example, at least one of the following conditions has to be satisfied for the slices and the tiles.

(1) All coded blocks in a slice belong to the same tile.

(2) All coded blocks in a tile belong to the same slice.

Both a slice including multiple tiles and a tile including multiple slices may be present in the same picture.

Tile ID (tile identification) may be designated in a raster scan order, and LCUs (or CTBs) in a tile may be ordered the in the block order and in the raster scan order.

FIG. 7 is a diagram schematically illustrating an example of the raster scan order of LCUs.

In the example illustrated in FIG. 7, a picture 710 includes one slice and one tile. Accordingly, in the example illustrated in FIG. 7, the slice and the tile have the same size as the picture 710.

Referring to FIG. 7, LCUs are ordered in the raster scan order in the picture (in the slice or in the tile).

FIG. 8 is a diagram schematically illustrating an example of the raster scan order of LCUs.

In the example illustrated in FIG. 8, a picture 810 includes one slice and 12 tiles, and each tile includes four LCUs.

Accordingly, in the example illustrated in FIG. 8, the slice has the same size as the picture 810, and the slice includes 12 tiles.

Referring to FIG. 8, the tiles are ordered in the raster scan order in the picture 810 (in the slice), and the LCUs are ordered in the raster scan order in each tile and are ordered in the raster scan order in the tile unit along with the tiles.

On the other hand, when the relationship between the tiles and the slices is flexible, a problem may occur in the decoding process.

FIG. 9 is a diagram schematically illustrating an example of a problem that may occur depending on the relationship between the slices and the tiles in the decoding process.

In the example illustrated in FIG. 9, a picture 910 includes two slices, each slice includes 6 tiles, and each tile includes four LCUs.

Referring to FIG. 9, a number allocated to each LCU is an LCU index for specifying the LCU, and the LCU indices are designated in the tile scan order. A number allocated to each tile is a tile ID (tile_id) for specifying the tile and the tile IDs are designated in the tile scan order.

An LCU to be processed next time after the process on an LCU with index n is completed is an LCU with index n+1. Accordingly, after LCU #7 (that is, the final LCU of a tile with a tile ID (tile_id) of 1 in the first slice) is processed (encoded/decoded), an LCU to be processed next time is LCU #8 in the example illustrated in FIG. 9. However, LCU #8 is an LCU belonging to a slice different from the slice including LCU #7, and LCUs not yet processed remain in the slice including LCU #7.

In this case, since the decoding is performed in the unit of slices, an LCU to be read and processed from an actual bitstream is LCU #16 which is a next LCU in the same slice as LCU #7, but the video decoder may determine that LCU #8 should be determined which is an LCU subsequent to LCU #7 in terms of the LCU indices.

Since the decoder may arrange reconstructed pixels of the LCUs at erroneous positions, this mismatch may cause a severe problem.

A method of imposing a predetermined constraint or signaling tile IDs may be considered to solve this problem. Embodiments of the invention will be specifically described below in this regard.

I. Constraint Application 1

In order to solve the problem illustrated in FIG. 9, the encoder and the decoder may impose predetermined constraints on the structure of the tiles and the slices as follows at the time of setting/specifying tiles and slices, Specifically, (1) when a picture includes multiple slices and multiple tiles, the tiles belonging to the same slice are consecutively ordered in the raster scan order. (2) when a picture includes multiple slices and multiple tiles, the tile IDs of the tiles belonging to the same slice are not broken but have to be consecutive.

In other words, the tiles present in a slice have to be consecutive in the raster scan order and the tile IDs (tile_id) have not to be discontinuous.

Figure 10:
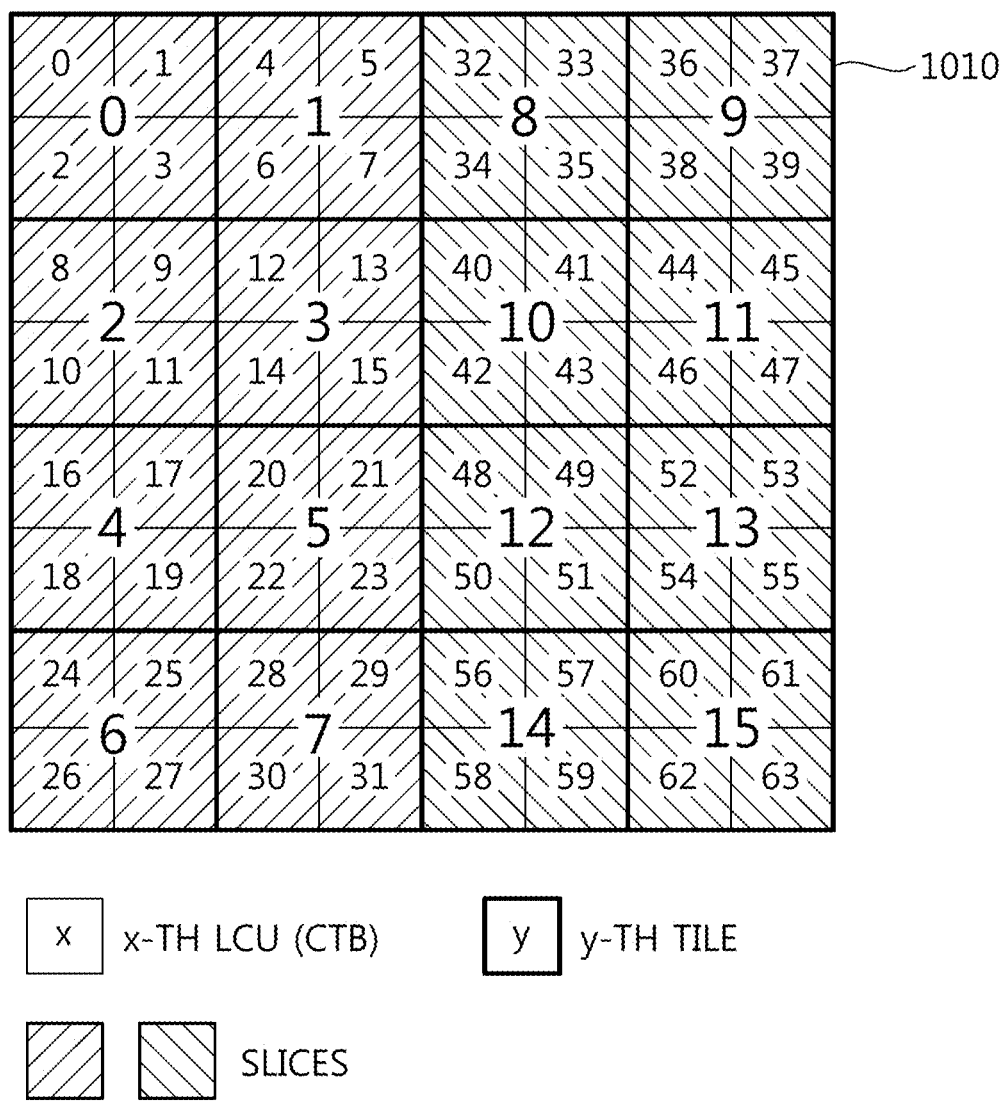
FIG. 10 is a diagram schematically illustrating an example of a structure of slices and tiles according to the invention.

FIG. 10 is a diagram schematically illustrating an example of structure of slices and tiles according to the invention.

In the example illustrated in FIG. 10, a picture 1010 includes two slices and each slice includes eight tiles.

In the example illustrated in FIG. 10, the first slice includes tiles 0 to 7 and the second slice includes tiles 8 to 15. In the example illustrated in FIG. 10, each tile includes four LCUs.

As illustrated, the tiles belonging to the same slice are consecutively ordered in the raster scan order depending on the constraints of the invention, and the tile IDs of the tiles in the same slice are not discontinuous.

Therefore, in consideration of a case where decoding of LCU #7 is completed, the decoder may decode LCU #8, which is the first LCU in a different tile (tile_id=2) in the same slice, subsequently to LCU #7.

II. Constraint Application 2

In addition to imposing of the above-mentioned constraints on the tiles and the slices, the encoder and the decoder may solve the problem illustrated in FIG. 9 by setting/specifying the tiles and the slices as follows.

(A) A tile is simultaneously present in a row and a column and includes an integer number of CTBs that are consecutively ordered in a coding tree block raster scan of the tile (in the tile). For example, in a picture, a rectangular region which is a common region of a column having a width corresponding to a predetermined number of LCUs and a row having a height corresponding to a predetermined number of LCUs may be set as a tile.

Division of each picture into tiles may be mentioned as partitioning. Tiles in a picture are consecutively ordered in the tile raster scan of the picture.

(B) Tile scan is a sequential ordering of CTBs into which a picture is partitioned. The tile scan ordering traverses CTBs (or LCUs) in the coding tree block raster scan in the tile, and traverses tiles in the raster scan order in the picture.

Even when a slice includes CTBs that are sequentially ordered in the coding tree block raster scan of a tile (in the tile), the CTBs does not need to be consecutively ordered in the coding tree block raster scan of a picture (in the picture).

(C) A slice includes an integer number of CTBs that are consecutively ordered in the tile scan. Division of each picture into slices is mentioned as partitioning. A coding tree block address may be derived from the first coding tree block address in the slice (as expressed in the slice header).

Therefore, since CTBs are ordered in the tile scan in a slice, the tiles in the slice are ordered in the raster scan and the CTBs in each tile are also ordered in the raster scan.

Here, the tile raster scan means the raster scan of tiles, and the coding tree block raster scan means the raster scan of coding tree blocks.

According to (A), (B), and (C) described above, CTBs in a slice are not ordered in the raster scan order, but are ordered in the tile scan order. Accordingly, the configuration as in the example illustrated in FIG. 9 may not be occurred.

FIGS. 11 to 15 are diagrams illustrating allowable tile and slice configurations and non-allowable tile and slice configurations depending on constraints I and II described above.

Figure 11:
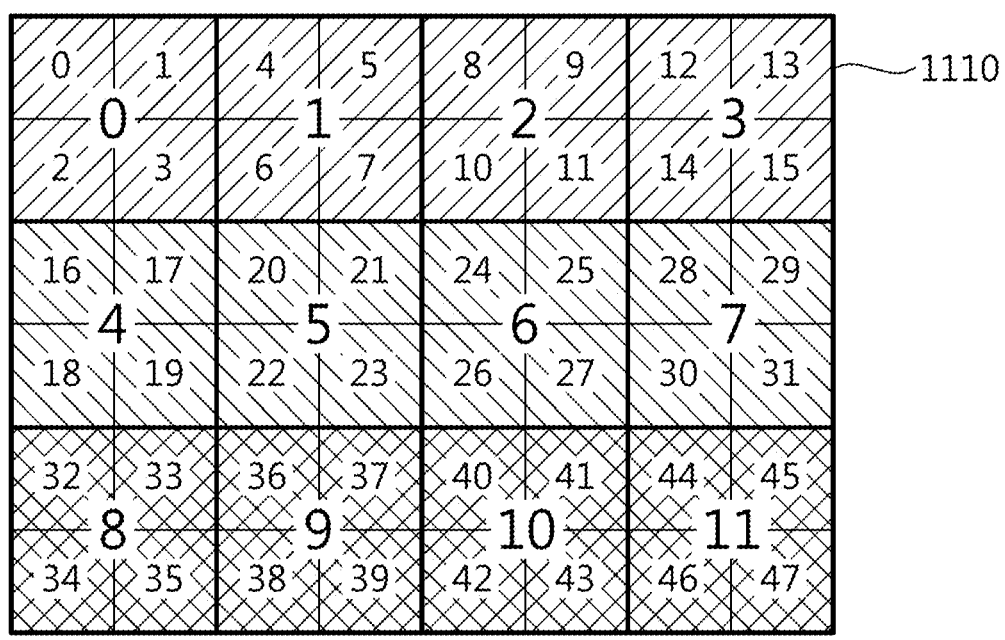

FIG. 11 illustrates an example where a picture 1110 includes three slices and each tile includes four CTBs. In the example illustrated in FIG. 11, the first slice includes tiles 0 to 3, the second slice includes tiles 4 to 7, and the third slice includes tiles 8 to 11.

The example illustrated in FIG. 11 is allowable based on constraints I and II since it satisfies both constraints I and II.

FIG. 12 illustrates an example where a picture 1210 includes four slices and each tile includes four CTBs. In the example illustrated in FIG. 12, the first slice includes tiles 0 and 1, the second slice includes tiles 2 to 5, the third slice includes tiles 6 to 9, and the fourth slice includes tiles 10 and 11.

The example illustrated in FIG. 12 is allowable based on constraints I and II since it satisfies both constraints I and II.

Figure 13:
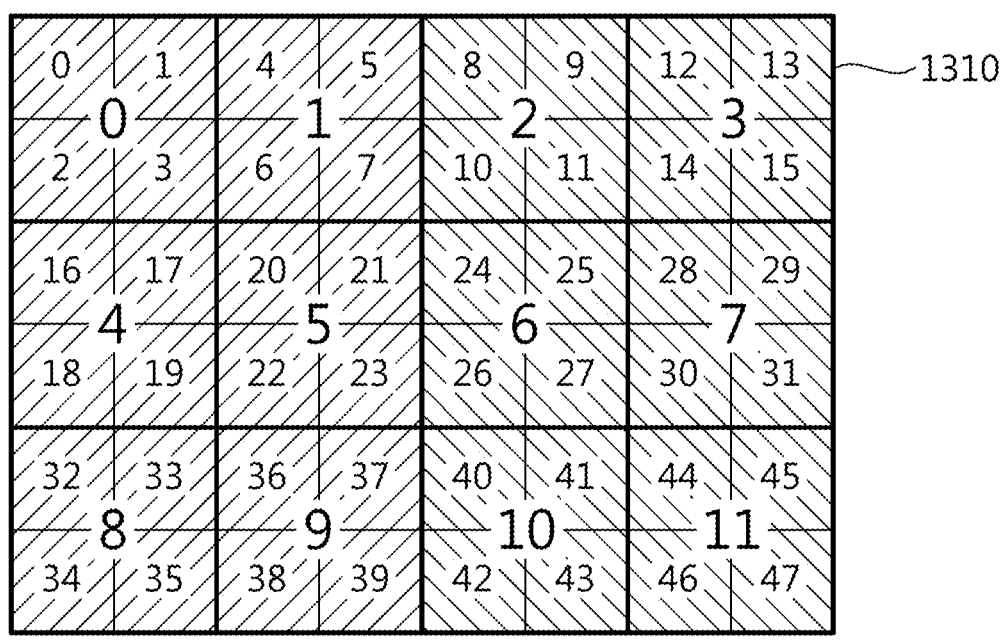

FIG. 13 illustrates an example where a picture 1310 includes two slices and each tile includes four CTBs. In the example illustrated in FIG. 13, the first slice includes tiles 0, 1, 4, 5, 8, and 9 and the second slice includes tiles 2, 3, 6, 7, 10, and 11.

The example illustrated in FIG. 13 is not allowable based on constraints I and II since it does not satisfy constraints I and II. Specifically, the tile IDs in each slice are not consecutive and the CTBs in each slice are not ordered in the tile scan.

Figure 14:
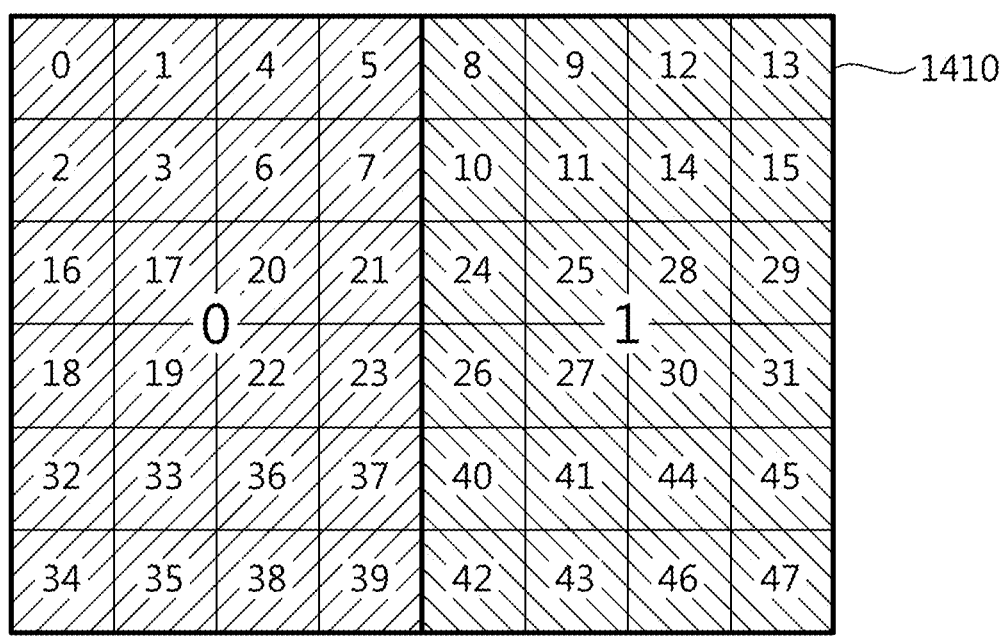

FIG. 14 illustrates an example where a picture 1410 includes two slices, each slice includes one tile, and each tile includes 24 CTBs.

The example illustrated in FIG. 11 is allowable based on constraints I and II since it satisfies both constraints I and II.

Figure 15:
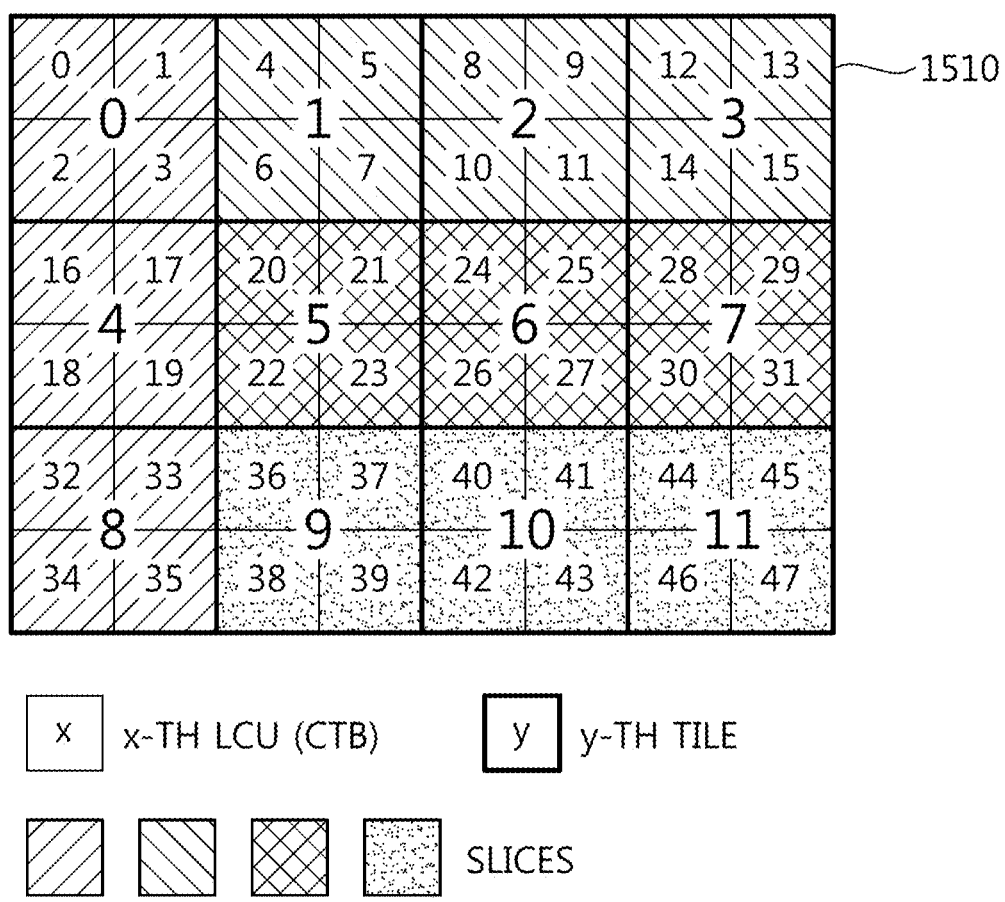

FIG. 15 illustrates an example where a picture 1510 includes four slices and each tile includes four CTBs. In the example illustrated in FIG. 15, the first slice includes tiles 0, 4, and 8, the second slice includes tiles 2 and 3, the third slice includes tiles 5, 6, and 7, and the fourth slice includes tiles 9, 10, and 11.

The example illustrated in FIG. 15 is not allowable based on constraints I and II since it does not satisfy constraints I and II. Specifically, the tile IDs in each slice are not consecutive and the CTBs in each slice are not ordered in the tile scan.

III. Transmission of Tile ID (tile_id)

In order to solve the problem illustrated in FIG. 9, the tile ID (tile_id) for each LCU may be indicated.

For example, in conjunction with entry points of tiles in each slice header, the tile ID information indicates with what tile an entry point offset is associated. Accordingly, what tile corresponds to an entry point in the slice header is signaled.

The number of entry point offsets may be equal to the number of tiles in a slice. Alternatively, in consideration of a point that the entry point offset corresponding to the first entry point may be 0, the number of entry point offset may be set to be equal to the number of tiles in the slice-1.

Here, the entry point may mean a point at which decoding is started in each tile or WPP (Wavefront Parallel Processing), and the entry point offset may specify the number of bits between two entry points. For example, entry point offset i indicates the difference between the number of bits of entry point i and and the number of bits of entry point i−1.

Table 1 schematically shows an example of slice header information corrected according to the invention.

TABLE 1

| slice_header( ) { | Descriptor |
|---|---|
| ... | |
| if( tiles_or_entropy_coding_sync_idc == 1 \|\| | |
|    tiles_or_entropy_coding_sync_idc == 2) { | |
|   num_entry_point_offsets | ue(v) |
|   if( num_entry_point_offsets > 0) { | |
|     offset_len_minus1 | ue(v) |
|     for( i = 0; i < num_entry_point_offsets; i++) { | |
|       entry_point_offset[ i ] | u(v) |
|       if (tiles_or_entropy_coding_sync_idc == 1) | |
|         offset_tile_id [i] | u(v) |
|     } | |
|   } | |
| } | |
| ... | |
| } | |

In Table 1, offset_tile_id[i] specifies an entry point offset associated with the i-th entry point offset (entry_point offset [i]).

The value of offset_tile_id[i] ranges from 0 to (num_tile_columns_minus1+1)*(num_tile_rows_minus1+1)−1.
offset_tile_id[i] may be expressed by the bit value of ceil (log 2(((num_tile_columns_minus1+1)*(num_tile_rows_minus1+1))).

Here, num_tile_columns_minus1 may specify the width of the i-th tile column in the unit of CTBs (that is, LCUs). That is, num_tile_columns_minus1+1 for offset_tile_id[i] indicates a value by which the width of the i-th tile column is expressed in the unit of CTBs.

In addition, num_tile_rows_minus1 may specify the height of the i-th tile row in the unit of CTBs (that is, LCUs). That is, num_tile_rows_minus1+1 for offset_tile_id[i] indicates a value by which the height of the i-th tile row is expressed in the unit of CTBs.

Figure 16:
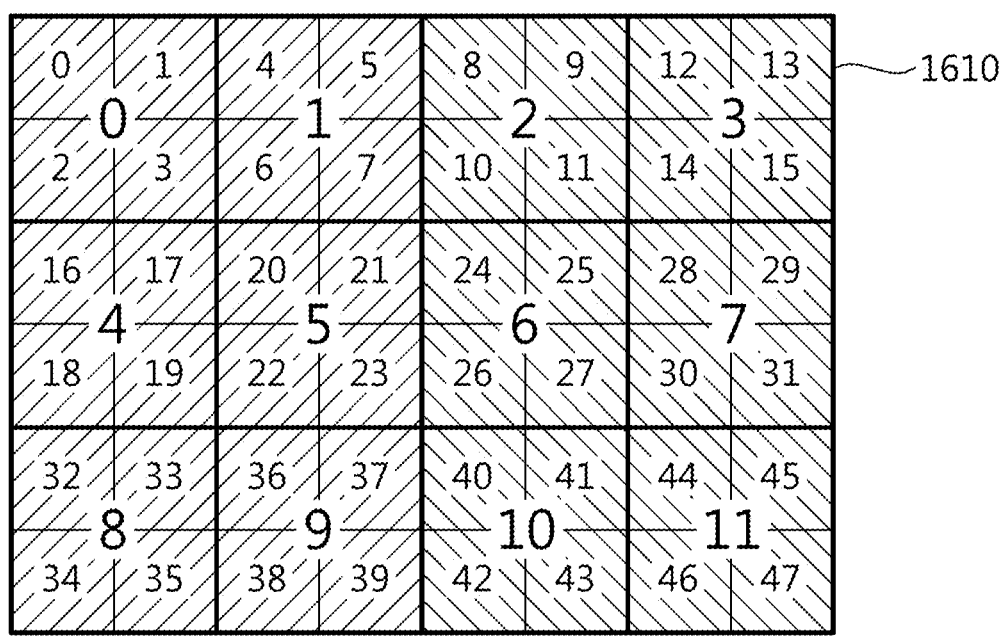
FIG. 16 is a diagram schematically illustrating an example of a tile and slice configuration when Table 1 is applied.

FIG. 16 is a diagram schematically illustrating an example of a tile and slice configuration when Table 1 is used.

In the example illustrated FIG. 16, a picture 1610 includes two slices, the first slice includes tiles 0, 1, 4, 5, 8, and 9 and the second slice includes tiles 2, 3, 6, 7, 10, and 11.

In the example illustrated in FIG. 16, each tile includes four CTBs.

Tables 2 and 3 schematically show examples where signalling shown in Table 1 is applied to FIG. 16.

Table 2 shows an example of signalling of the first slice in FIG. 16.

TABLE 2

For 1st slice:

```
num_entry_point_offsets: 6
entry_point_offset[ 0 ] points to first bit of LCU #0
offset_tile_id [ 0 ]: 0
entry_point_offset[ 1 ] points to first bit of LCU #4
offset_tile_id [ 1 ]: 1
entry_point_offset[ 2 ] points to first bit of LCU #16
offset_tile_id [ 2 ]: 4
entry_point_offset[ 3 ] points to first bit of LCU #20
offset_tile_id [ 3 ]: 5
entry_point_offset[ 4 ] points to first bit of LCU #32
offset_tile_id [ 4 ]: 8
entry_point_offset[ 5 ] points to first bit of LCU #36
offset_tile_id [ 5 ]: 9
```

In the first slice illustrated in FIG. 16, the number of entry point offsets is six, and each entry point offset may specify the first bit of the first LCU (CTB) in each tile. In the example shown in Table 2, the number of entry point offsets of the first slice is set to six, but the entry point offset may not be signaled for each entry point. For example, since the first entry point is the first bit of the first LCU in the slice and the offset value thereof is 0, the entry point offset of the first entry point may not be signaled, but the number of entry point offsets may be set to 5 and only five offsets from the offset for the second entry point may be signaled. Table 3 schematically shows an example of signaling of the second slice in FIG. 16.

TABLE 3

For 2nd slice:

```
num_entry_point_offsets: 6
entry_point_offset[ 0 ] points to first bit of LCU #8
offset_tile_id [ 0 ]: 2
entry_point_offset[ 1 ] points to first bit of LCU #12
offset_tile_id [ 1 ]: 3
entry_point_offset[ 2 ] points to first bit of LCU #24
offset_tile_id [ 2 ]: 6
entry_point_offset[ 3 ] points to first bit of LCU #28
offset_tile_id [ 3 ]: 7
entry_point_offset[ 4 ] points to first bit of LCU #40
offset_tile_id [ 4 ]: 10
entry_point_offset[ 5 ] points to first bit of LCU #44
offset_tile_id [ 5 ]: 11
```

In the second slice illustrated in FIG. 16, the number of entry point offsets is six, and each entry point offset may specify the first bit of the first LCU (CTB) in each tile. In the example shown in Table 3, the number of entry point offsets of the second slice is set to six, but the entry point offset may not be signaled for each entry point. For example, since the first entry point is the first bit of the first LCU in the slice and the offset value thereof is 0, the entry point offset of the first entry point may not be signaled, but the number of entry point offsets may be set to 5 and only five offsets from the offset for the second entry point may be signaled.

As shown in Tables 1 to 3, by signaling the entry points, the decoder may accurately specify a decoding order and a decoding target.

Hitherto, I, II, and III are described as individual embodiments, but embodiments of the invention are not limited to I, II, and III. For example, I, II, and III may not only be individually embodied but also may be embodied together.

Specifically, (1) and (2) of I may be simultaneously performed on the basis of (A), (B), and/or (C) of II. III may be applied on the basis of (A), (B), and/or (C) of II to signal the information on the entry points. (1) and (2) of I may be performed on the basis of III to signal the information on the entry points. In addition, (1) and (2) of I and (A), (B), and/or (C) of II may be applied on the basis of III to signal the information on the entry points.

Figure 17:
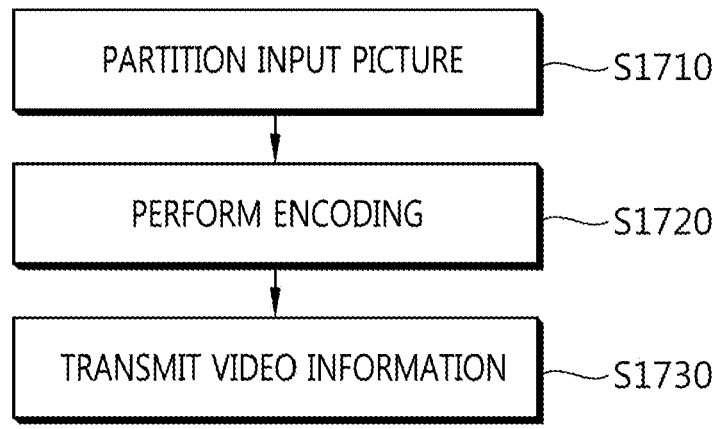
FIG. 17 is a flowchart schematically illustrating an encoding method according to the invention.

FIG. 17 is a flowchart schematically illustrating a video encoding method according to the invention.

Referring to FIG. 17, the video encoder may partition an input picture (S1710). The video encoder may partition the input picture to specify tiles and slices. A picture may include one or more tiles and one or more slices. A slice and a tile include CTBs (LCUs). Here, the LCUs (CTBs) in a slice may be ordered in the tile scan. Details of the tile scan are the same as described above.

For example, when a slice includes multiple tiles, the multiple tiles may be ordered in the raster scan order in the slice. Each tile may include multiple LCUs, and the LCUs may be ordered in the raster scan order in each tile.

Constraints for parallel processing may be applied to the tiles and the slices. For example, a tile in the input picture must not traverse a slice boundary, and a slice must not traverse a tile boundary.

A tile may include a natural number of complete slices when the tile includes slices, and a slice may include a natural number of complete tiles when the slice includes tiles.

The video encoder may perform an encoding process on the basis of the tiles and the slices (S1720). Since a picture can be partitioned into one or more tile and one or more slices and the constraints for parallel processing are imposed on the tiles and the slices, the video encoder may encode the tiles and/or slices in parallel through the use of the processing cores.

In the encoding step, CUs into which an LCU is partitioned in accordance with the quad-tree structure may be set as a unit of encoding.

The video encoder may transmit encoded video information (S1730).

When a current picture includes multiple tiles, the video encoder may cause the video information to include information indicating the first bit of the first LCU in each tile out of the second or subsequent tiles. At this time, the information may be information indicating an offset between the first bit of the first LCU in a current tile and the first bit of the first LCU in a previous tile.

The video information may include information on slices and tiles specified on the basis of the constraints for the parallel processing.

For the purpose of convenience of explanation, it is described above with reference to FIG. 17 that the video encoder performs the steps, but the invention is not limited to this configuration. For example, step S1710 may be performed by the picture partitioning module 105 of FIG. 1, step S1720 may be performed by functional blocks other than the picture partitioning module 105 in FIG. 1, and step Sq730 may be performed by a particular transmission module or the entropy encoding module 130. Here, the transmission module may not be separately provided, but may be included in the entropy encoding module 130.

Figure 18:
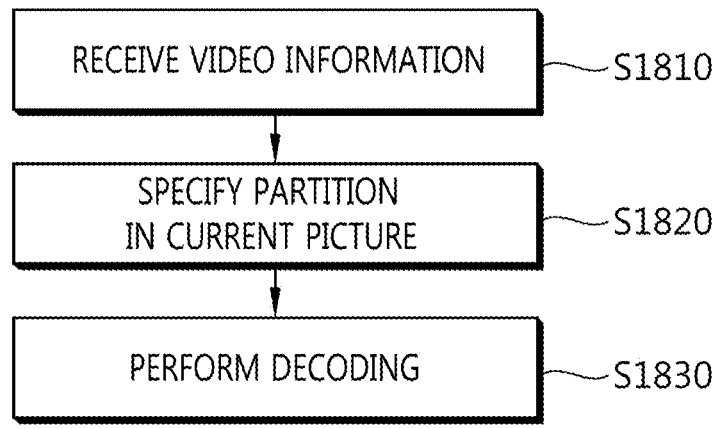
FIG. 18 is a flowchart schematically illustrating a decoding method according to the invention.

FIG. 18 is a flowchart schematically illustrating a video decoding method according to the invention.

Referring to FIG. 18, the video decoder may receive video information (S1810). The video decoder may receive video information transmitted from the video encoder and the video information may include information for specifying tiles and slices in a current picture.

When a current picture includes multiple tiles, the video encoder may cause the video information to include information indicating the first bit of the first LCU in each tile out of the second or subsequent tiles. At this time, the information may be information indicating an offset between the first bit of the first LCU in a current tile and the first bit of the first LCU in a previous tile.

The video decoder may specify partitions of the current picture on the basis of the received video information (S1820). The video decoder specifies the slices and the tiles in the current picture on the basis of the information for specifying the tiles and the slices, which is included in the video information. At this time, the current picture may be partitioned into one or more tiles and one or more slices, and each slice and each tile may include CTBs (LCUs).

The LCUs (CTBs) in a slice may be ordered in the tile scan. Details of the tile scan are the same as described above.

For example, when a slice includes multiple tiles, the multiple tiles may be ordered in the raster scan order in the slice. Each tile may include multiple LCUs, and the LCUs may be ordered in the raster scan order in each tile.

Constraints for parallel processing may be applied to the tiles and the slices. For example, a tile in the input picture must not traverse a slice boundary, and a slice must not traverse a tile boundary. A tile may include a natural number of complete slices when the tile includes slices, and a slice may include a natural number of complete tiles when the slice includes tiles.

The video decoder may perform a decoding process on the basis of the specified tiles and slices (S1830).

In the decoding step, the CUs into which an LCU is partitioned on the basis of the quad-tree structure may be set as the unit of decoding.

Since a picture can be partitioned into one or more tile and one or more slices and the constraints for parallel processing are imposed on the tiles and the slices, the video decoder may encode the tiles and/or slices in parallel through the use of the processing cores.

Here, it is described above that the video decoder performs the steps of FIG. 18, but this is for the purpose of convenience of explanation and the invention is not limited to this configuration. For example, step S1810 may be performed by a particularly reception module or the entropy decoding module. The reception module may not be separately provided but may be included in the entropy decoding module. Step S1820 and step S1830 may be performed by the functional blocks of FIG. 2. For example, when modules performing the functions other than the reception function are referred to as a decoding module, steps S1820 and S1830 may be performed by the decoding module. When the entropy decoding module includes the reception module, step S1810 may be performed by the reception module in the decoding module.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

The invention claimed is:

1. A video encoding method by an encoding apparatus, the method comprising:
specifying one or more tiles and one or more slices in a current picture, wherein a tile is a common rectangular region of a column of largest coding units (LCUs) and a row of LCUs and the slice comprises an integer number of LCUs;
deriving information on the tile and information on the slice based on the specifying; and
encoding video information including the information on the tile and the information on the slice to generate a bitstream,
wherein LCUs in the tile are ordered consecutively in raster scan order,
wherein tiles in the slice are ordered consecutively in raster scan order based on a case that the slice covers an integer number of the tiles, and
wherein tile IDs specifying the tiles ordered in the slice are consecutive.

2. The method of claim 1, wherein the step of encoding includes encoding in a unit of a coding unit (CU) which is divided from a LCU.

3. The method of claim 1, wherein the video information includes entry point information, and
wherein the entry point information indicates a first bit of a first LCU in each tile of a second tile and the tiles subsequent thereto based on a case that the current picture includes a plurality of tiles.

4. The method of claim 3, wherein the entry point information indicates an offset between a first bit of a first LCU in a current tile and a first bit of a first LCU in a previous tile.

5. The method of claim 1, wherein the video information is entropy encoded based on Adaptive Arithmetic Coding.

6. A non-transitory computer-readable storage medium storing a bitstream generated by a method, the method comprising: specifying one or more tiles and one or more slices in a current picture, wherein a tile is a common rectangular region of a column of largest coding units (LCUs) and a row of LCUs and the slice comprises an integer number of LCUs, deriving information on the tile and information on the slice based on the specifying and encoding video information including the information on the tile and the information on the slice to generate the bitstream,
wherein LCUs in the tile are ordered consecutively in raster scan order,
wherein tiles in the slice are ordered consecutively in raster scan order based on a case that the slice covers an integer number of the tiles, and
wherein tile IDs specifying the tiles ordered in the slice are consecutive.

7. The method of claim 6, wherein the video information includes entry point information, and
wherein the entry point information indicates a first bit of a first LCU in each tile of a second tile and the tiles subsequent thereto based on a case that the current picture includes a plurality of tiles.

8. The method of claim 7, wherein the entry point information indicates an offset between a first bit of a first LCU in a current tile and a first bit of a first LCU in a previous tile.

9. The method of claim 6, wherein the video information is entropy encoded based on Adaptive Arithmetic Coding.

10. A transmission method of data for video, the transmission method comprising:
obtaining a bitstream, wherein the bitstream is generated by performing specifying one or more tiles and one or more slices in a current picture, wherein a tile is a common rectangular region of a column of largest coding units (LCUs) and a row of LCUs and the slice comprises an integer number of LCUs, deriving information on the tile and information on the slice based on the specifying and encoding video information including the information on the tile and the information on the slice to generate the bitstream; and and transmitting the data comprising the bitstream, wherein LCUs in the tile are ordered consecutively in raster scan order, wherein tiles in the slice are ordered consecutively in raster scan order based on a case that the slice covers an integer number of the tiles, and wherein tile IDs specifying the tiles ordered in the slice are consecutive.

11. The method of claim 10, wherein the video information includes entry point information, and wherein the entry point information indicates a first bit of a first LCU in each tile of a second tile and the tiles subsequent thereto based on a case that the current picture includes a plurality of tiles.

12. The method of claim 11, wherein the entry point information indicates an offset between a first bit of a first LCU in a current tile and a first bit of a first LCU in a previous tile.

13. The method of claim 10, wherein the video information is entropy encoded based on Adaptive Arithmetic Coding.

* * * * *